G. P. Goodwin,
Twine Holder,
No. 57,496.    Patented Aug. 28, 1866

Witnesses
John E. Crane
J. S. Whitney

Inventor
George P. Goodwin

UNITED STATES PATENT OFFICE.

GEORGE P. GOODWIN, OF LOWELL, MASSACHUSETTS.

IMPROVED TWINE-SPOOL AND STAND.

Specification forming part of Letters Patent No. 57,496, dated August 28, 1866.

*To all whom it may concern:*

Be it known that I, GEORGE P. GOODWIN, of Lowell, in the county of Middlesex and State of Massachusetts, have invented a new and useful Improvement in Spools and Stands or Hangers for Wrapping-Twine, of which the following is a full, clear, and exact description, reference being had to the accompanying drawings, making part of this specification, in which—

Figure 1:
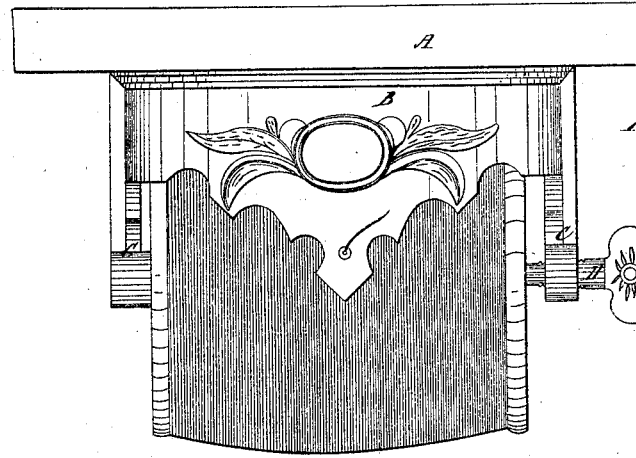
Figure 2:
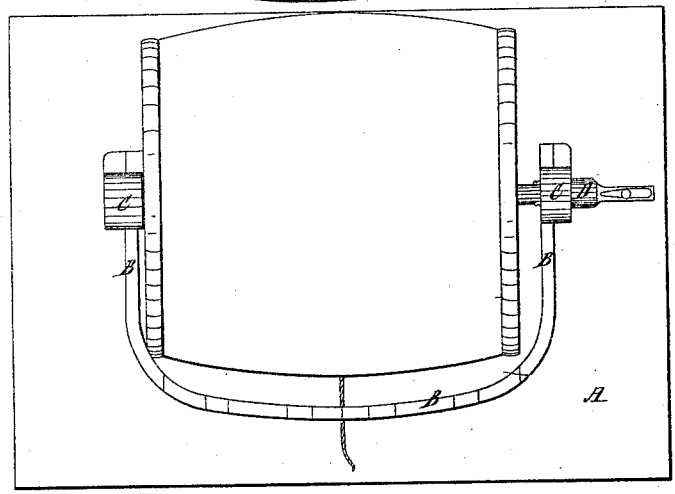
Figure 3:
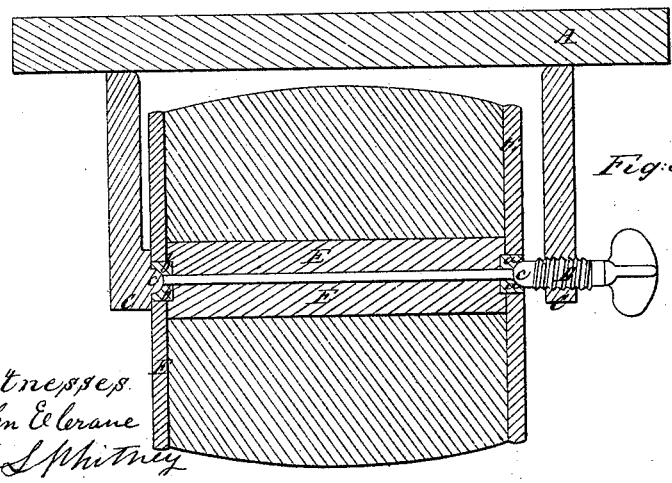

Figure 1 is a front elevation; Fig. 2, a bottom side; Fig. 3, a longitudinal vertical section, the plane of the section passing through the center of the spool.

This invention consists in a conveniently-arranged stand or hanger secured to the upper or under side of a counter or other similar fixture, or to the side of a room or store, and a large spool having wrapping-twine upon it, when the said spool has countersunk bushings fitted into the ends and is arranged to turn on friction-centers passing through or projecting from the inner sides of ears formed in one with the stand at the extremities of the same, and when one or both of the friction-centers are adjustable in the ears by screw-threads formed on the center plugs and a hole through the ear or ears tapped to receive said plug.

In the drawings, A is a portion of a counter or table, and a stand, B, is secured to the under side. Ears C project downward from the lower edge of the stand at each end thereof.

A center plug, D, screws through one of the ears C. The end of this plug is rounded and fits into a rounded countersink in the bushings $a$ at one end of the spool E. In the opposite end of the spool is a bushing, $b$, and a friction-center, $c$, fits into a countersink formed like that first named. Tightening the screw-plug D causes the center $c$ to press against the bushings $a$ and $b$ in the ends of the spool, thereby regulating the action of the spool when twine is drawn off from the same by increasing or diminishing the friction, as may be most convenient and advantageous, for if the spool is allowed to turn too freely considerable more twine than is wanted is run off from the spool every time it is used. This loose twine gets tangled and knotted, and is frequently cut off and wasted, and if the spool has no regulating device it will sometimes turn so hard as to break the twine without moving the spool.

The object of this invention is to provide a convenient spool and stand for wrapping-twine, and have the twine spun and wound onto spools and furnished to the trade in that form instead of balls of twine, a considerable portion of which is wasted either in running it off from the balls onto temporary spools or out of a box or case.

This stand and spool may be fastened to the top of a counter or table, or to the under side of the same, or up to the side of a store or room, or on a post, or to the ceiling, and when all the twine has been used the spool is easily removed by turning back the screw D, another spool put into the place of the empty one, and the screw tightened to any desired degree.

I claim—

As a new article of manufacture, a twine-spool and stand composed of the hanger, bushings, friction-centers, and thumb-screws, all arranged to operate substantially as and for the purpose set forth.

GEORGE P. GOODWIN.

In presence of—
JOHN E. CRANE,
J. S. WHITNEY.